W. A. PUTRAW.
SAFETY CRANKING DEVICE FOR INTERNAL COMBUSTION ENGINES.
APPLICATION FILED OCT. 30, 1915.
1,175,012.
Patented Mar. 14, 1916.
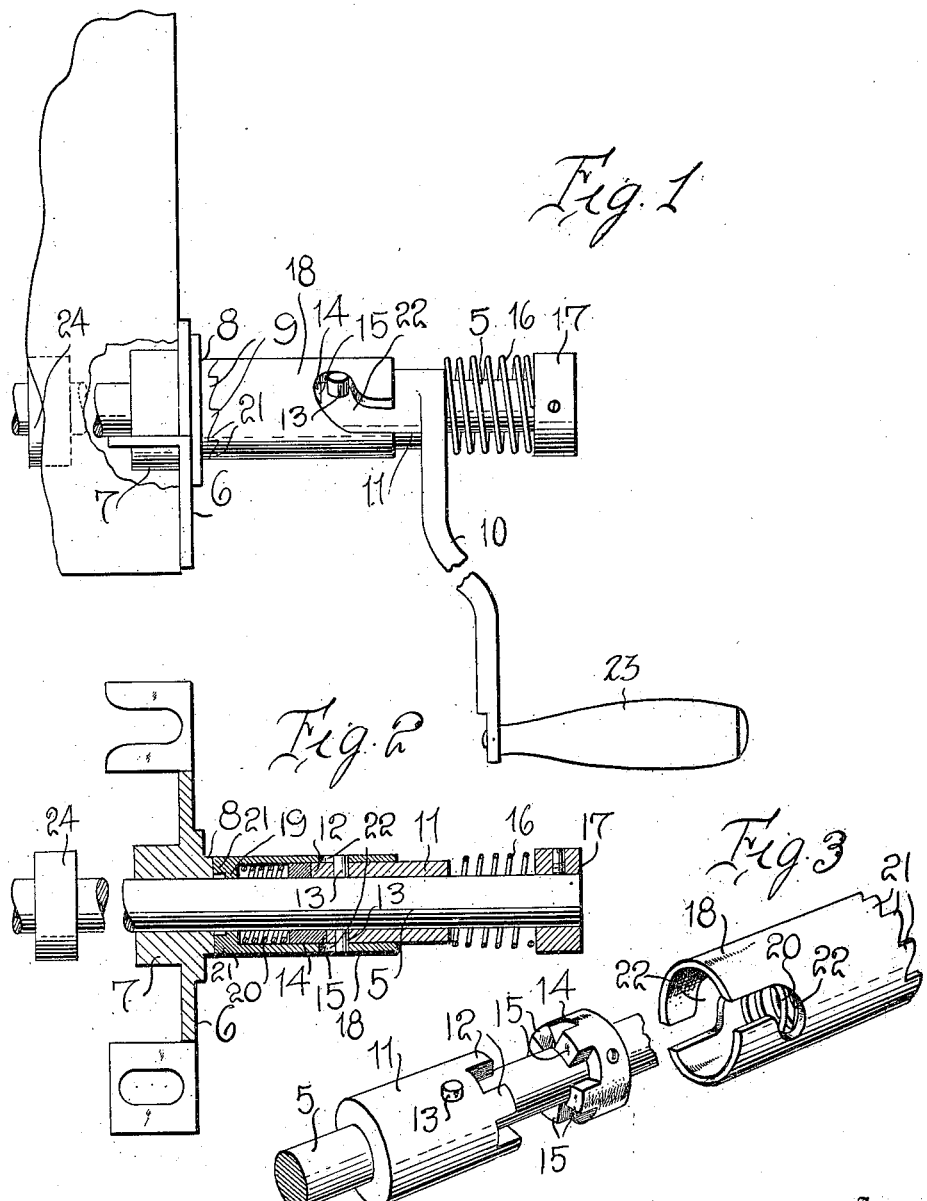
Inventor
W. A. PUTRAW
By Watson E. Coleman
Attorney

UNITED STATES PATENT OFFICE.

WILLIAM A. PUTRAW, OF NORTH RIVER, NEW YORK.

SAFETY CRANKING DEVICE FOR INTERNAL-COMBUSTION ENGINES.

1,175,012.  Specification of Letters Patent.  Patented Mar. 14, 1916.

Application filed October 30, 1915. Serial No. 58,882.

*To all whom it may concern:*

Be it known that I, WILLIAM A. PUTRAW, a citizen of the United States, residing at North River, in the county of Warren and State of New York, have invented certain new and useful Improvements in Safety Cranking Devices for Internal-Combustion Engines, of which the following is a specification, reference being had to the accompanying drawings.

This invention relates to an improved safety cranking device for internal combustion engines and has for its primary object to provide a device for cranking the engine of a motor vehicle to start the operation thereof, which is so constructed that reverse movement of the crank handle upon back-fire of the engine whereby the operator might be seriously injured, is obviated.

It is another and more particular object of the invention to provide an operating crank loosely mounted upon an extension of the engine shaft and provided with clutch teeth held by means of a spring normally in locked engagement with the teeth of a clutch collar fixed to said shaft, and a spring pressed sleeve loosely surrounding the crank sleeve and having clutch teeth held by the spring for engagement with the fixed clutch disk to prevent rotation of the sleeve in one direction, and co-acting means on said sleeve and the sleeve of the crank for locking the same together to rotate the engine shaft in one direction and acting upon a reverse rotation of the shaft to move the clutch on the crank out of locked engagement with the fixed clutch on said shaft.

It is a further general object of the invention to improve and simplify the construction of safety cranking devices for engines and render the same reliable and efficient in operation, and capable of use in connection with the ordinary motor vehicle engine without necessitating any material alterations in the vehicle construction.

With the above and other objects in view, my invention consists in the novel features of construction, combination and arrangement of parts to be hereinafter more fully described, claimed and illustrated in the accompanying drawing, in which, Figure 1 is a side elevation illustrating the preferred embodiment of my improved safety cranking device; Fig. 2 is a longitudinal section thereof; Fig. 3 is a perspective view of a portion of the engine shaft and the operating crank.

Referring in detail to the drawing, 5 designates the usual crank shaft for starting the engine, which is adapted for detachable clutching engagement at its inner end with the engine shaft. A plate 6 is suitably fixed to the radiator casing and is provided with a hub 7 through which the shaft 5 extends. Upon the outer face of this plate, a disk 8 is fixed, and upon said disk an annular series of clutch teeth 9 are formed.

10 designates the crank bar having a laterally extending sleeve 11 formed upon one end thereof which is loosely engaged upon the shaft 5. This sleeve is provided upon its extremity with the spaced clutch teeth 12 and radially projecting studs 13 are formed upon the opposite sides of this sleeve. A collar 14 is fixed upon the shaft 5 having the clutch teeth 15 which are opposed to the complementary clutch teeth 12 on the sleeve of the crank bar. A coil spring 16 is arranged upon the end of the shaft 5 and bears at one of its ends against a collar 17 fixed to said shaft and at its other end against the sleeve 11, said spring normally acting to hold the teeth on said sleeve in clutched engagement with the teeth on the fixed collar 14. A sleeve 18 loosely surrounds the sleeve 11 on the crank shaft, said sleeve being closed at one of its ends by the wall 19. Between this wall and the collar 14 fixed on the shaft 5, a coil spring 20 is arranged, said spring acting to force the sleeve longitudinally and yieldingly hold the clutch teeth 21 formed on the end of said sleeve in engagement with the clutch teeth 9 on the disk 8.

The sleeve 18 is provided at diametrically opposite points in its wall, at its outer end, with bayonet slots 22 to receive the respective studs 13 on the sleeve 11. The crank, of course, is provided with a suitable handle indicated at 23, whereby the same may be operated.

In the operation of the invention, in order to impart a starting impulse to the engine, the crank 10 is turned from left to right, and as the sleeve 11 of the crank is in locked engagement with the clutch collar 14 fixed on the engine shaft, said shaft is also rotated. The sleeve 18 is turned in unison with the engine shaft, the studs 13 being engaged in the inner ends of the bayonet slots in said sleeve. The teeth 21 of the sleeve will move idly over the opposed teeth 9 on the disk 8. Upon back-firing of the engine, when the charge is ignited, upon the reverse rotation of the engine shaft, the shaft 5 becomes uncoupled therefrom and is longitudinally shifted. The sleeve 18 will be held against such reverse turning movement as the teeth thereof will be in locked engagement with the fixed clutch teeth 9. Thus, the studs 13 on the sleeve of the crank will be brought into bearing engagement with the corresponding walls of the respective bayonet slots 22 in the sleeve and forced outwardly in said slots, thereby moving the crank sleeve longitudinally on the end of the shaft against the action of the spring 16 and disengaging the clutch teeth on said sleeve from the teeth on the fixed collar 14. Upon the shaft 5, a collar 24 is arranged adjacent to the engine, and this collar by contact with the bearing 7 limits the longitudinal shifting movement of the shaft and crank sleeve 22 to such an extent that the lugs 13 would move entirely out of the slots 22, thereby permitting the crank to turn upon the shaft. Thus, after the crank is disconnected from the clutch collar 14, it is held against reverse turning movement by the sleeve 18.

It will, therefore, be seen that the reverse turning movement of the crank will be very slight, while the engine shaft is free to continue its rotation in the operation of the engine. In this manner, liability of the operator being struck by a violent blow of the crank handle is obviated. It will be manifest that, in view of the simple construction of the device, the same can be readily applied to the ordinary motor vehicle without requiring the exercise of mechanical skill or any material alterations in the construction of the vehicle or engine shaft. The invention provides means which is absolutely safe for the operator whereby the engine may be quickly started in operation.

While I have shown and described the preferred construction and arrangement of the several elements employed, it is to be understood that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

1. A cranking device for engines including in combination with the crank shaft, a clutch collar fixed upon said shaft, a crank bar having a sleeve loosely engaged upon said shaft and provided with clutch teeth upon its end, a spring arranged upon the shaft to yieldingly hold the teeth on the sleeve in engagement with the clutch collar, a second sleeve surrounding said collar and the sleeve on the crank bar and having clutch teeth on one end, a fixed clutch, a spring acting against the sleeve to hold the teeth thereon in bearing engagement with the fixed clutch, said fixed clutch holding the sleeve against rotation in one direction, and co-acting means upon the sleeve of the crank bar and said latter sleeve to rotate the sleeves and shaft in unison in one direction when the crank is turned, said means acting to force the crank sleeve longitudinally and out of engagement with the clutch collar when the shaft rotates in a reverse direction.

2. A cranking device for engines including in combination with the crank shaft, a clutch collar fixed upon said shaft, a crank bar having a sleeve loosely engaged upon said shaft and provided with clutch teeth upon its end, a spring arranged upon the shaft to yieldingly hold the teeth of the sleeve in engagement with the clutch collar, a second sleeve surrounding said collar and the sleeve on the crank bar and having clutch teeth on one end, a fixed clutch, a spring acting against the sleeve to hold the teeth thereon in bearing engagement with the fixed clutch, said fixed clutch holding the sleeve against rotation in one direction, said sleeve being provided with bayonet slots, and studs on the sleeve of the crank bar engaged in the respective slots to rotate the sleeves in unison with the shaft when the crank is turned in one direction, said studs riding against the walls of said slots when the shaft rotates in a reverse direction and acting to force the sleeve on the crank bar out of locked engagement with the clutch collar.

3. A cranking device for engines including in combination with the crank shaft adapted to be coupled to the engine shaft, a clutch collar fixed upon said shaft, a crank bar having a sleeve loosely engaged upon said shaft and provided with clutch teeth upon its end, a spring arranged upon the shaft to yieldingly hold the teeth of the sleeve in engagement with the clutch collar, a second sleeve surrounding said collar and the sleeve on the crank bar and having clutch teeth on one end, a fixed clutch, a spring acting against the sleeve to hold the teeth thereon in bearing engagement with the fixed clutch, said fixed clutch holding the sleeve against rotation in one direction, said sleeve being provided with bayonet slots, studs on the sleeve of the crank bar engaged in the respective slots to rotate the sleeves in unison with the crank shaft when the crank is turned in one direction, said studs riding against the walls of said slots when the crank shaft rotates in a reverse direction and acting to force the sleeve on the crank bar out of locked engagement with the clutch collar, and means for limiting the movement of the crank shaft in one direction to prevent complete disengagement of said studs from the bayonet slots in the second named sleeve.

In testimony whereof I hereunto affix my signature in the presence of two witnesses.

WILLIAM A. PUTRAW.

Witnesses:
J. H. AMEDEN,
Ross AMEDEN.